(No Model.)
R. HABERMANN.
ABSORPTION FREEZING MACHINE.
No. 321,965. Patented July 14, 1885.
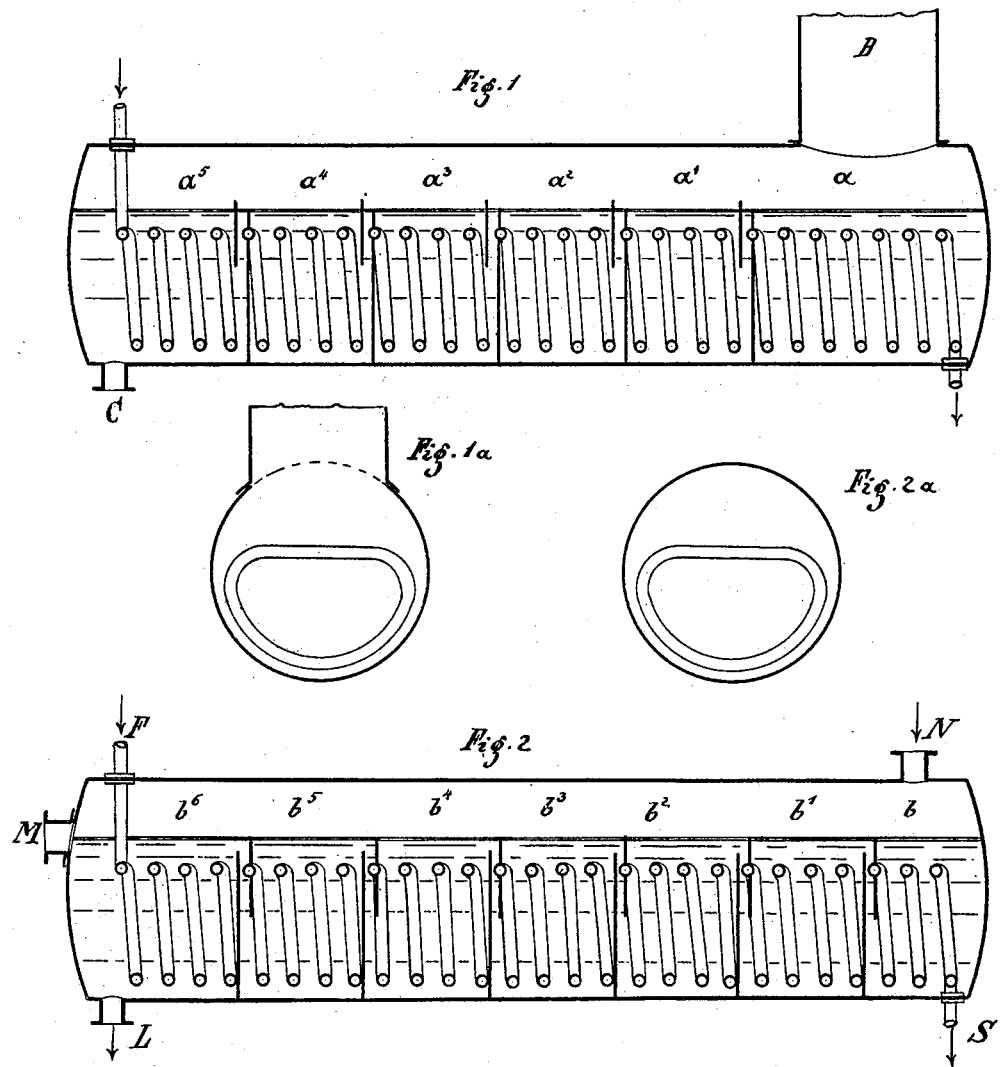

UNITED STATES PATENT OFFICE.

RUDOLPH HABERMANN, OF BERLIN, GERMANY.

ABSORPTION FREEZING-MACHINE.

SPECIFICATION forming part of Letters Patent No. 321,965, dated July 14, 1885.

Application filed May 15, 1885. (No model.)

*To all whom it may concern:*

Be it known that I, RUDOLPH HABERMANN, a subject of the King of Prussia, in the German Empire, residing at Berlin, Prussia, Germany, have invented a new and useful Improvement in Freezing-Machines, of which the following is a specification.

My invention relates to improvements in absorption freezing-machines—that is to say, to the kind in which liquid bodies pass over into the gaseous state—and the gases generated in the ice-former are removed by their absorption into another suitable body—for example, ammoniacal gas absorbed into non-saturated aqueous solution of ammonia, (salmiak-geistlösung), ammoniacal gas into glycerine, methylamine into a non-saturated mixture of methylamine and water. &c.

The object of my invention is, by means of these improvements, so to conduct the process of ice-making as to effect a great saving of fuel and expense. For instance, in the case of refrigerating-machines of the ordinary kind, ten kilograms of ice are produced by the expenditure of one kilogram of coal, whereas my improvements allow of eighteen kilograms of ice being produced by the expenditure of a similar quantity of coal.

A freezing-machine in accordance with my invention consists substantially of an ammonia-boiler giving off ammonia, a condenser, an ice-former, an absorption-vessel, and a pump. The chief function of the machine is the continuous evaporation within the ice-former of a liquid for the purpose of dissipating heat. The other functions have for object to transform the gas evolved in the ice-former back again into the liquid state.

In the drawings, Figure 1 is an elevation, and Fig. 1ᵃ a transverse section, of the boiler. Fig. 2 is an elevation, and Fig. 2ᵃ a transverse section, of the absorber.

Aqueous solution of ammonia saturated with ammonia is supplied to the ammonia-boiler and heated, whereupon a portion of the ammonia passes over into the gaseous state and collects in the condenser, where it is cooled down, and thus transformed into a liquid which is conducted into the ice-former. In order to remove the gas generated in the ice-former, it is conducted into the absorption-vessel, which contains non-saturated aqueous solution of ammonia, and there becomes absorbed in the said solution. The heat thereby generated is dissipated by means of cooling-water. The saturated aqueous solution of ammonia is passed back again into the ammonia-boiler, and the process goes on over again.

The aqueous solution of ammonia employed for the absorption in the absorption-vessel of the ammoniacal gas is obtained from the ammonia-boiler, in which the ammoniacal gas had by the application of heat been driven out of the aqueous solution of ammonia. This aqueous solution of ammonia is cooled down by passing it through a cooling-worm. According to the usual practice, when the aqueous solution of ammonia supplied to the machine contained in one hundred parts, by weight, thirty-two parts, by weight, of ammonia, the solution poor in ammonia entered the absorption-vessel in the proportion of about twenty-five parts, by weight, of ammonia to one hundred parts, by weight, of the aqueous solution of ammonia, and there became saturated to the former extent. The aqueous solution of ammonia thus took up about one-fourteenth of its weight of ammonia, and in this state was pumped back into the ammonia-boiler; therefore thirteen-fourteenths of the aqueous solution of ammonia carried one-fourteenth of ammoniacal gas. The heat applied to the ammonia-boiler on the one hand evaporates the ammonia in the aqueous solution of ammonia, and on the other hand brings to the boiling-point the aqueous solution of ammonia pumped into the ammonia-boiler from the absorption-vessel. Hitherto when the heat required for expelling a given quantity of ammonia from the aqueous solution of ammonia was, say, two hundred and sixty-six units, it was necessary to employ two hundred and seventy-seven units for heating the aqueous solution of ammonia pumped into the ammonia-boiler.

If it be required, the aqueous solution of ammonia may be heated in the boiler to such an extent that all the ammonia shall be expelled, in which case the liquid conducted from the ammonia-boiler into the absorption-vessel would be water. When this water becomes saturated again by taking up ammonia, one hundred parts, by weight, consist of sixty-eight parts water and thirty-two parts ammonia. Thus in this case two-thirds of water are the carriers of one-third of ammonia. Therefore it is not necessary to supply the absorption-vessel with so much weak aqueous solution of ammonia, (water,) and consequently a less quantity of saturated aqueous solution of ammonia has to be pumped into the ammonia-boiler, where a correspondingly smaller quantity of heat has to be expended in the heating of the same.

Now, in order that the aqueous solution of ammonia destined for the absorption of the ammoniacal gas in the absorption-vessel may only contain a small quantity of ammonia, we construct the ammonia-boiler in the manner shown in the accompanying drawings at Fig. 1—that is to say, in several chambers. Heat may be applied thereto by means of a fire or by means of steam.

The aqueous solution of ammonia is pumped into the ammonia-boiler at B when it first enters the chamber $a$, and mixes with the aqueous solution of ammonia there present. The contents of the first chamber, $a$, overflow into the second chamber, $a'$, and so on to the others and last of the chambers, whence, after giving off ammonia, it is again conducted to the absorption-vessel through the outlet C. The ammonia-boiler is shown provided with a steam-heating worm.

The heating operation takes place in the following manner: The last chamber, $a^5$, of the several chambers receives the greatest heat, and the first chamber, $a$, the least heat. The aqueous solution of ammonia in the first chamber, $a$, contains the most ammonia, and requires little addition to its temperature in order to expel ammonia. On the contrary, it is necessary to apply a greater heat to the chamber $a^5$ in order to obtain ammoniacal gas therefrom, by reason of its contents having become poor in ammonia. The object in view is to have the solution as poor as possible in ammonia, so that only a comparatively small quantity of the aqueous solution of ammonia is required in the absorption-vessel. For instance, when the aqueous solution of ammonia is very poor in ammonia, a small quantity of the same may absorb a comparatively large quantity of the ammoniacal gases in the absorption-vessel. Thus when the aqueous solution of ammonia is conducted back to the ammonia-boiler a lesser quantity of the same has to be heated up to the temperature of the solution in the said boiler.

Instead of expelling as much ammonia as is possible from the aqueous solution of ammonia in the ammonia-boiler, the absorption-vessel may be constructed in such manner that the aqueous solution of ammonia may absorb a comparatively large quantity of ammonia. For this reason, also, a lesser quantity of the solution suffices for the absorption of the ammoniacal gas.

Fig. 2 of the accompanying drawings shows the absorption-vessel constructed for the aforesaid purpose. The ammoniacal gas coming from the ice-former enters at M. At N the aqueous solution of ammonia poor in ammonia enters the vessel, passing into the chamber $b$, and finally leaving the vessel at L.

T is the inlet for the cooling-water, and S the outlet for the same. The ammoniacal gas entering at M fills the vessel. Then the weakest solution enters the chamber $b$ through N, at which point the least cooling-power is required for the absorption of the ammoniacal gas. The chamber $b^6$ has, on the contrary, taken up a large quantity of ammonia, and therefore requires greater cooling-power to render it capable of taking up an additional quantity of ammoniacal gas. The greater cooling-power is obtained in the chamber $b^6$, and proportionately in the other chambers, by reason of the fresh cooling-water being caused to enter the vessel at T, the end of the absorption-vessel where the solution contains the largest quantity or is most saturated with ammonia.

What I claim as my invention, and desire to secure by Letters Patent, is—

1. The construction and arrangement of freezing-machines, substantially in the manner set forth and illustrated in the accompanying drawings, for the purpose of so conducting the freezing process that the absorbing-liquid in being prepared for repeated use as an absorbing medium shall, where it contains the largest proportion of the freezing-body, come in contact with heating-surfaces of a lower temperature than where it contains the smallest or a smaller proportion of the freezing medium, and in such manner that the said absorbing-liquid shall be of different temperatures and degrees of concentration at different parts of its bulk.

2. The construction and arrangement of freezing-machines so that the gas, the absorbing-liquid, and the cooling-water are supplied to the absorbing-space in such manner that the gas enters at the place where the absorbing-liquid is the most highly concentrated and cooled by cooling-water of the coldest temperature, while where the absorbing-liquid is less or the least concentrated and of greater capability of absorption it is cooled by the cooling-water that has gradually increased in temperature, substantially as set forth.

In testimony whereof I have signed this specification in the presence of two subscribing witnesses.

RUDOLPH HABERMANN.

Witnesses:
M. W. MOORE,
B. ROI.